United States Patent [19]

Bell

[11] Patent Number: 4,958,048
[45] Date of Patent: Sep. 18, 1990

[54] MODULAR ELECTRICAL SYSTEM

[76] Inventor: Peter D. Bell, P.O. Box 788, Merritt Island, Fla. 32952

[21] Appl. No.: 295,399

[22] Filed: Jan. 10, 1989

[51] Int. Cl.$^5$ ............................................. H02G 3/12
[52] U.S. Cl. ........................................ 174/53; 174/57
[58] Field of Search ................... 174/53, 57; 220/3.2, 220/3.7; 200/297; 439/535

[56] References Cited

U.S. PATENT DOCUMENTS

| | | | |
|---|---|---|---|
| 2,397,688 | 4/1946 | Osinski | 174/53 |
| 2,410,287 | 10/1946 | Jaberg | 174/53 |
| 3,157,732 | 11/1964 | Richards | 174/53 |
| 3,609,647 | 9/1971 | Castellano | 439/535 |
| 3,858,161 | 12/1974 | Champion | 439/535 |
| 3,885,852 | 5/1975 | Grove | 439/441 |
| 3,889,132 | 6/1975 | Vrelland | 307/141 |
| 3,922,478 | 11/1975 | Perkey | 174/53 |
| 4,165,443 | 8/1979 | Figart et al. | 174/53 |
| 4,295,018 | 10/1981 | Borrelli | 200/51.09 |
| 4,500,746 | 2/1985 | Meehan | 174/48 |
| 4,627,675 | 12/1986 | Taylor et al. | 439/92 |
| 4,636,914 | 1/1987 | Belli | 361/331 |

Primary Examiner—Leo P. Picard
Assistant Examiner—David A. Tone
Attorney, Agent, or Firm—Dennison, Meserole, Pollack & Scheiner

[57] ABSTRACT

A modular electrical wiring system comprising outlet boxes including laterally spaced positioning plates slidably receiving modular devices therebetween. Each modular device including a forwardly opening housing receiving slide-in busses in accord with the internal circuitry desired. A cooperating face block seals the forward end of the housing, providing appropriate access to or control of the internal circuitry defined by the internal busses. Power and distribution cables engage the internal circuitry through wire receiving compartments in the top wall of the module. The module includes side locking plates releasably engageable with the positioning plates of the outlet box for a retention of the positioned module.

25 Claims, 4 Drawing Sheets

MODULAR ELECTRICAL SYSTEM

BACKGROUND OF THE INVENTION

The invention is generally concerned with an electrical wiring system for buildings of all types, including residences, commercial establishments, factories, etc.

Conventionally, the wiring of a structure, beyond the service panel at which point power is introduced into the building, has involved the positioning of outlet or wall boxes, the running of power lines to and through the boxes, the engagement of the power lines with electrical fixtures outward of the boxes, and the mounting of the fixtures, normally with excess wire, within the boxes. As will be appreciated by one familiar with standard wiring, substantial hand work is involved in mounting and wiring the individual fixtures, particularly in systems utilizing anything other than the simplest arrangement of receptacles, switches, and the like.

There has been activity with regard to the development of systems utilizing modular components to facilitate installation, reduce wiring complexity, and the like.

However, the known systems themselves incorporate limitations as to versatility and practicality, and frequently would appear to have difficulty in complying with local and national electrical codes. For example, the requirements for accessibility, as applied to wiring methods, normally requires that the fixtures, whether switches, receptacles, or the like, be capable of removal or exposure without damage to the building structure or finish. Such accessibility in a conventional hand wired system is provided for by the common expedient of coiling excess wire within the receptacle or outlet box behind the individual fixture, a common if not particularly desirable arrangement. However, various of the systems devised to facilitate wiring in themselves give rise to problems of accessibility in particular for a variety of reasons, including an inability to easily manipulate or remove the fixture once assembled within the outlet box, and/or restricted access to the point of engagement of the wires with the fixture.

Another problem with modular systems heretofore proposed has been the limited adaptability thereof to a variety of different wiring situations, basically lacking the complete versatility of a hand wired system.

SUMMARY OF THE INVENTION

The modular electrical wiring system of the present invention includes fixture modules and outlet boxes particularly adapted to accommodate the modules both as a separate cooperating element and as a packaged component thereof. The relationship between the basic module and outlet box is such as to provide for complete accessibility to the installed module and the wiring associated therewith for any of the conventional reasons including repair, upgrade or installation of further units.

The outlet box is specifically configured to be equally adaptable for right hand and left hand installation. The fixture modules, in turn, are adapted for releasable locking engagement within the outlet boxes with each module being freely accessible from the open forward face of the associated outlet box through the simple expedient of releasing easily manipulated clamp means. The modules themselves incorporate a body or shell which is adapted for internal configuration, utilizing a unique bus bar system, to define any conventional fixture, whether this be a switch, double receptacle, or the like.

The modules, regardless of the internal configurations thereof, are accommodated in the outlet boxes in the same manner, either as a separately supplied component installed at the building site or as a companion component premounted within the box and delivered as an assembly for installation.

Both the box and the module of the invention are particularly cost efficient to manufacture and install.

In addition to the economies associated with the installation of the system of the invention, significant advantages are achieved in that the installation can be by other than skilled electricians as there is substantially no likelihood of error. In regard thereto, the modular system of the invention is particularly adapted for "hot-checking" before the dry wall or other interior finishing is installed. In this manner, a completely operational system is insured.

At each stage of the installation the wiring is effected as a "plug-in" system, including the original introduction of the power lines to the modules and the feeding of power between ganged modules.

Other features and advantages of the invention will become apparent from the more detailed description of the construction and manner of use of the invention following hereinafter.

DESCRIPTION OF PREFERRED EMBODIMENTS

Referring now more specifically to the drawings, the modular electrical system of the invention consists essentially of fixture modules 10 and outlet or wall boxes 12 which receive and mount the modules.

The basic box 12, as illustrated in FIGS. 1–5, includes opposed side walls or panels 14 interconnected by a full height back wall or panel 16. Upper and lower pairs of laterally inwardly directed flanges 18 are integrally formed with the upper and lower edges of the opposed side panels respectively and are coextensive with the front-to-rear depth thereof to define upper and lower end walls. The flanges 18 terminate in laterally spaced free edges 20. Upper and lower pairs of vertical positioning plates 22 are affixed, by welding, integral molding, or the like, to the inner edges 20 in laterally spaced parallel relation to each other. The positioning plates 22 are elongate and extend forwardly from the rear wall 16 to a point just inward of the forward face of the box 12. Each positioning plate 22 projects both vertically inward and vertically outward of the corresponding flange edge 20. An elongate locking groove 24 is defined in the lateral outer face of each positioning plate 22 vertically between the inner edge 26 thereof and the corresponding flange 18. Each of the grooves 24 opens through the forward edge 28 of the positioning plate and extends rearwardly therefrom for the complete length of the positioning plate, or at least a major portion thereof.

The wall box 12 is completed by the provision of an angle mounting bracket 30 affixed to the outer face of one of the side walls or panels 14. The bracket is oriented to position the mounting or nailing leg 32 thereof to extend parallel to the forward face of the box 12 and slightly recessed rearwardly thereof. As desired, the bracket leg 32 can be provided with holes for the reception of driven fasteners, or alternatively can be provided with struck-out nailing prongs as illustrated.

Figure 1:
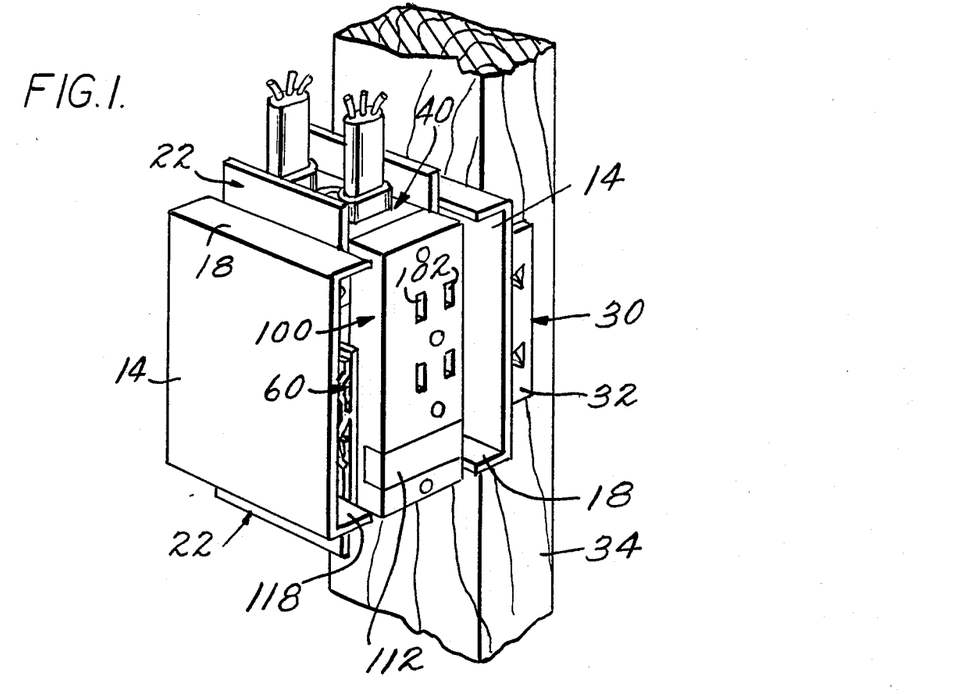
FIG. 1 is a perspective view of a stud-mounted outlet box and a wired modular electrical fixture in accord with the invention.
Figure 2:
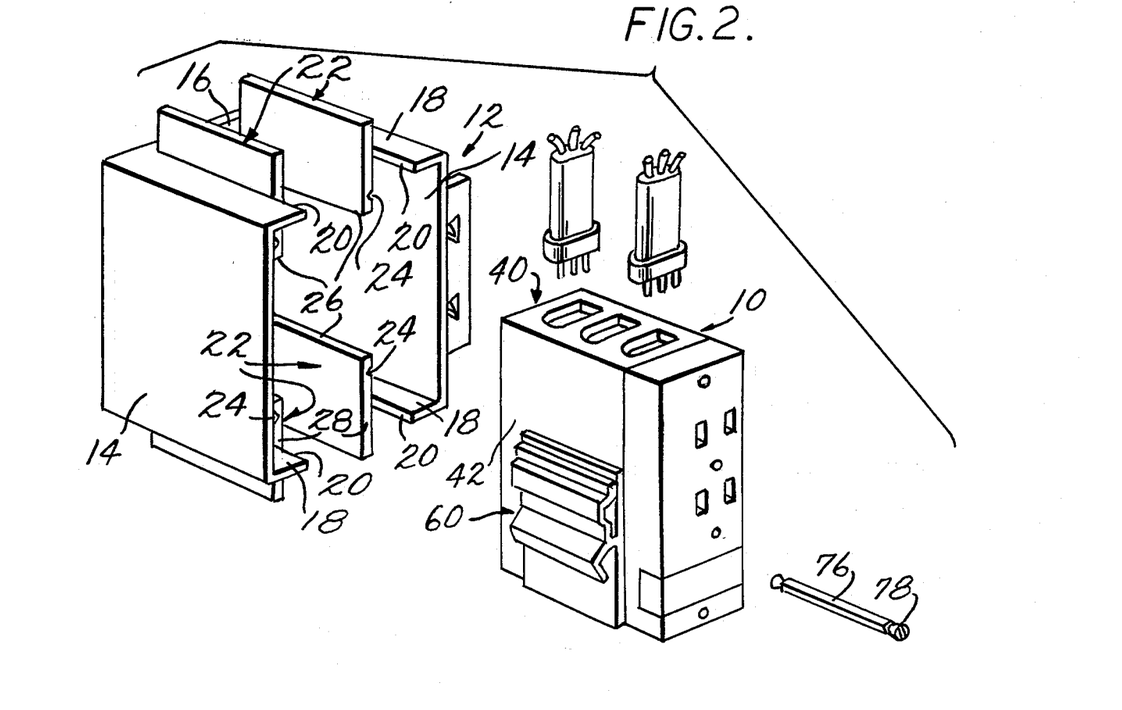
FIG. 2 is an exploded perspective view of the box, fixture and clamp means, and the wire ends.
Figure 3:
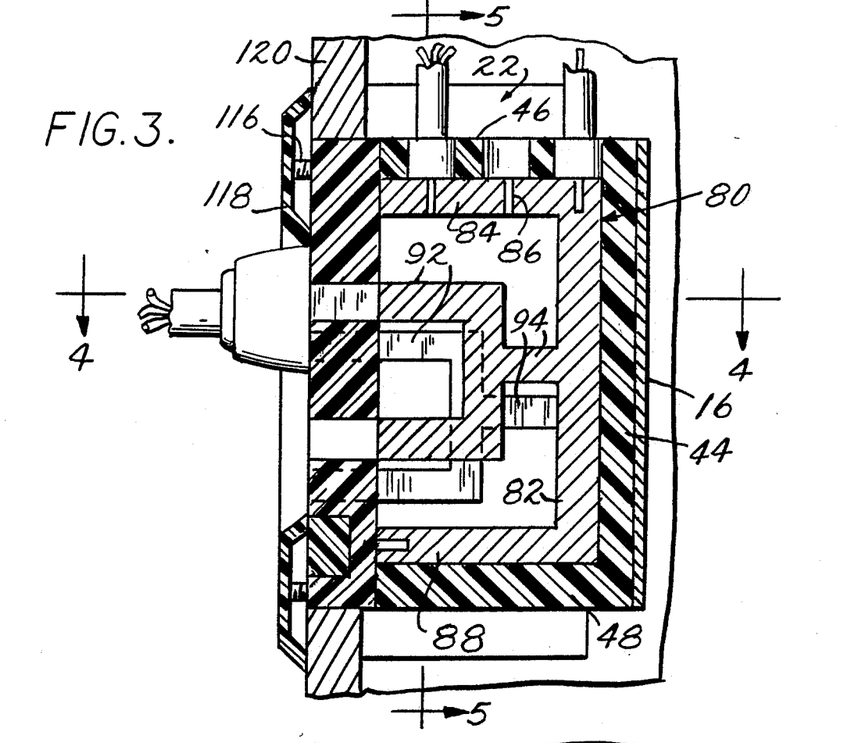
FIG. 3 is a vertical cross-section, substantially on plane 3—3 in FIG. 4, through an assembled box and module within a finished wall and with an inserted plug.

Inasmuch as the box 12, other than for bracket 30, is symmetrical to each side of the vertical front-to-rear center line, the box is equally adapted for mounting to the right side or left side of a building stud 34 or the like as suggested in FIG. 1. This will, in an obvious manner, entail merely an inverting of the box.

The fixture module or block 10 is a modular electrical unit which cooperatively mounts within the wall or outlet box 12 and, through modular components therein, is formed in accord with the function thereof, whether a receptacle, switch, or the like.

The basic module includes a rectilinear housing or shell 40 with opposed side walls 42, rear wall 44, top wall 46 and bottom wall 48 defining a forwardly opening chamber. Extending inwardly from the open front of the module housing 40 along the inner surfaces of the top and bottom walls 46 and 48 for the full depth of the chamber are multiple channels 50 defined by vertical ribs 52. The upper and lower channels are vertically aligned with each other and with similarly formed channels 53 on the inner surface of the rear wall 44 to define pockets. Preferably four sets of aligned pocket-defining channels are provided for maximum versatility in a single modular construction. The housing 40 and channel-defining ribs therein are of a non-conductive material, and are preferably integrally molded of an appropriate synthetic resin.

The top wall 46 of the module is provided with three transverse recessed plug compartments 54 which open into the upper channels 50.

A pair of molded or extended mounting clips 56, also of an appropriate synthetic resin, are provided one on each of the side walls 42 of the module housing 40 for releasably mounting the module 10 within the wall box 12. Each mounting clip 56 includes a rectangular base plate 58 affixed to the corresponding side wall 42 and a locking plate 60 paralleling the outer face of base plate 58 with an integral hinge 62 molded between the base plate 58 and the locking plate 60. The hinge of each mounting clip 56 extends horizontally and maintains the locking plate 60 in slightly outwardly spaced relation to the base plate 58. The locking plate 60 includes an upper camming panel 64 and a lower pressure panel 66. The upper camming panel 64, in upwardly spaced relation to the corresponding hinge 62, is outwardly offset along the length thereof and defines a full length camming recess or channel 68 inwardly opening toward the base plate 58. The pressure panel 66 includes a first upper portion 70 angling outward relative to the hinge 62 and a second lower portion 72 angling inward and terminating in a full length inwardly directed locking detent or lip 74.

Figure 4:
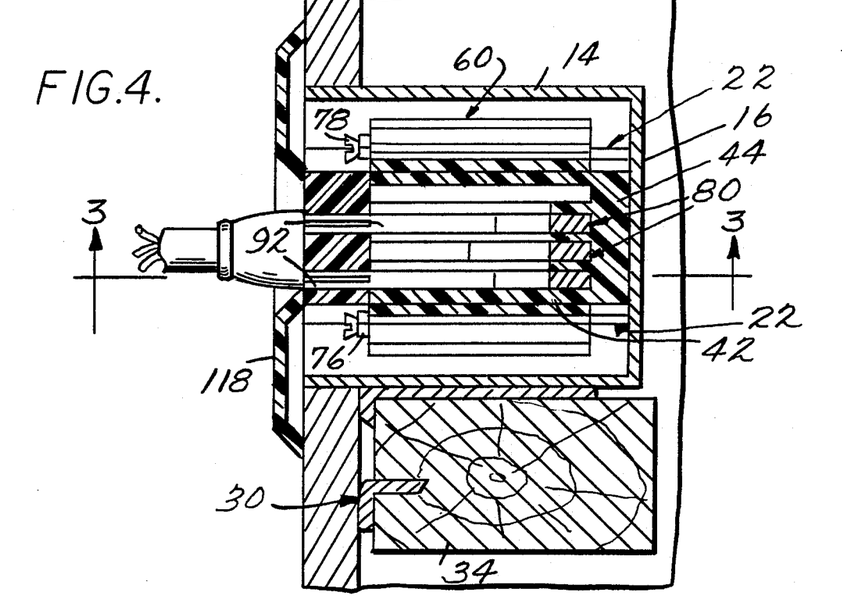
FIG. 4 is a horizontal cross-section substantially on plane 4—4 in FIG. 3.
Figure 5:
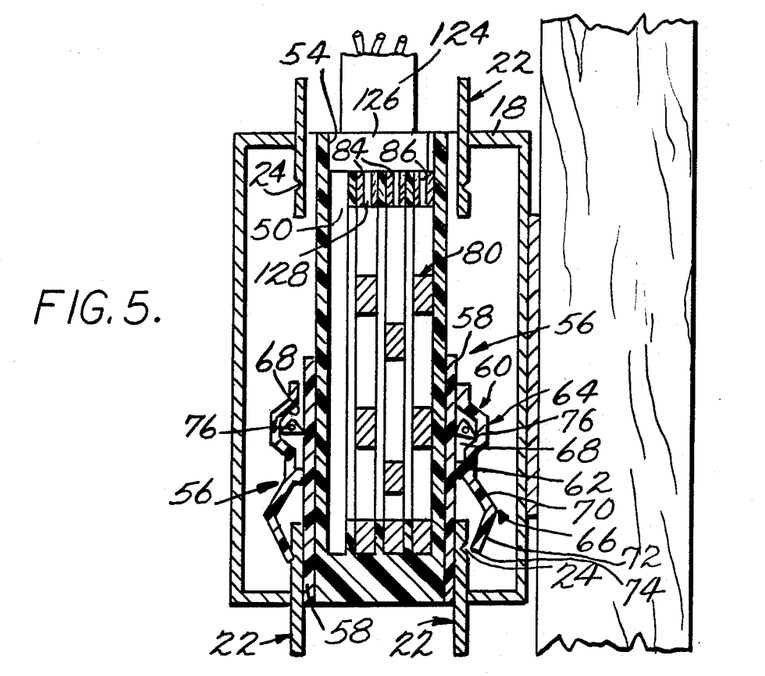
FIG. 5 is a vertical cross-section substantially on plane 5—5 in FIG. 3.

Noting FIGS. 4 and 5 in particular, the module 10 is slidably positioned inward through the front of the wall box 12 into engagement with the back panel 16. The opposed base plates 58 of the mounting clips 56 slidably engage the inner surfaces of the opposed lower positioning plates 22 with the lower portions of the associated pressure panels 66 located immediately outward of the respective positioning plates 22 and with the respective locking lips 74 aligned with and along the locking grooves 24 in immediately outwardly spaced relation to the outer surfaces of the positioning plates 22.

The releasable locking of the module 10 within the wall box 12, through the mounting clips 56 is effected by a pair of camming rods or shafts 76 of generally trigonal cross section which are received in the camming recesses 68 of the opposed locking plates 60 and which, upon rotational manipulation, selectively outwardly cam the upper camming panels 64 and, through the intermediate hinges 62, inwardly pivot the lower pressure panels 66 to forcibly engage the locking lips 74 within the respective grooves 24. In this manner, the module 10 is effectively locked within the wall box, while at the same time being readily released therefrom for replacement, servicing, and the like as shall be discussed subsequently. Manipulation of the camming rods 76 is facilitated by the provision of a kerf head 78 on the outer end of each rod for accommodation of a screwdriver as a readily available means for effecting the locking and unlocking of the locking plates. Incidentally, it is contemplated that the hinge 62 incorporate a sufficient resilient memory so as to return the mounting clip to its open position, as noted in the right hand clip 56 of FIG. 5, upon release of the camming pressure. As such, the camming shaft is, in effect, single acting to pivot the locking lip 74 into engagement within the associated groove 24 with subsequent release of the camming pressure resulting in an automatic outward extraction of the locking lip from the groove. When engaged within the grooves, the locking lips 74 preclude both vertical and horizontal movement, in any direction, relative to the wall box.

As will be noted, the height of the module is substantially equal to that of the height of the wall box, other than for the outer projecting portions of the vertical positioning plates 22. Further, inasmuch as the upper and lower portions of the wall box 22 are symmetrical, it will be recognized that the module can be properly accommodated therein regardless of the position of the wall box, for example to the right or left of a wall stud.

Figure 6:
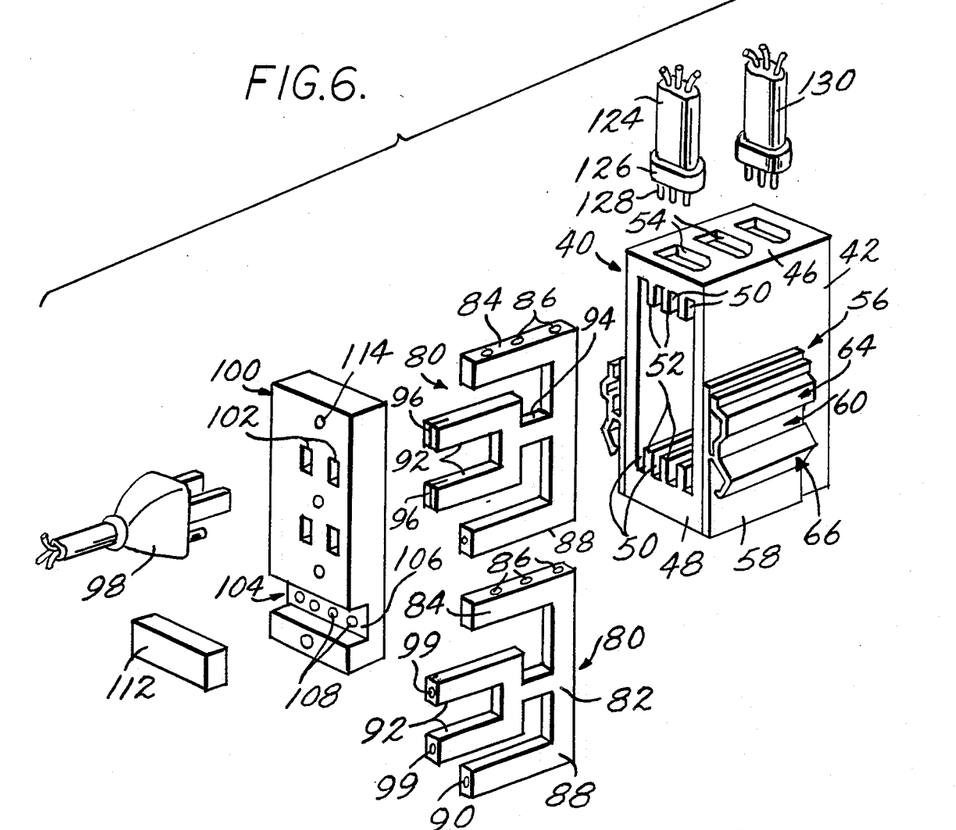
FIG. 6 is an exploded perspective view principally of selected elements of a typical receptacle fixture in accord with the invention.

Turning again specifically to the module 10, the internal chamber of the housing 40 is universal, that is will accommodate to any terminal block or electrical fixture whether a wall receptacle, switch, or the like. In the housing 40, the vertical channel-defined pockets, in accord with what is to be the specific function of the module, slidably receive specifically configured bus bars 80. Each bus 80 includes, in a vertical orientation of the module 10 as illustrated, a back or inner trunk 82 extending within a rear wall groove 53 between a vertically aligned pair of grooves 50. The bus 80 further comprises a forwardly extending upper power branch 84 received in the uppermost groove 50 of the corresponding pair of grooves and including a series of wire sockets 86 therein, one aligned with each of the plug compartments 54. The basic bus also includes a bottom transfer branch 88 extending forwardly from the trunk 82 and including a forwardly directed pin socket 90. The intermediate branch or branches 92 are configured in accord with the particular device to be defined by the module, that is a double receptacle as illustrated in FIG. 6, a switch as suggested in FIG. 7, etc. For example, noting the double receptacle construction of FIGS. 3–6, three busses 80 are provided within three adjacent channel pockets. The two outer busses 80 define the hot contacts and neutral contacts respectively for a double receptacle, and include two vertically aligned central branches 92 between the upper and lower branches 84 and 88, which as illustrated may extend from a common stem 94. Each of the intermediate branches 92 terminate in a prong socket 96 defined at the forward end thereof. The sockets 96 in the two busses 80 are positioned to receive the hot and neutral prongs of electrical plugs 98 in the manner of a conventional receptacle. The ground pins of the plugs 98 will be accommodated within forwardly directed pin sockets 99 defined at the forward ends of intermediate branches 92 on a ground bus 80 provided between the hot and neutral busses. Noting FIG. 3 in particular, the section line is drawn through the neutral bus with the intermediate branches 92 of the ground bus appearing in full lines therebehind and downwardly offset in accord with the positioning of the ground prongs.

Each module 10 includes a face block 100 which is coextensive with the front of the module housing 40, sealing the chamber and confining the busses 80 thereat. This face block 100, also of a non-conductive molded synthetic resin, can be mounted permanently, as by adhesive bonding, sonic welding, or the like, or removably mounted by screws, snap locks, or the like. The face block 100, as will be appreciated from the drawings, is configured in accord with the function of the module 10 and the bus arrangement therein. In the double receptacle of FIGS. 3, 4 and 6, the face block includes prong openings 102 configured for reception of the plug prongs and aligned with the bus sockets 96 which may, as suggested in FIG. 3, extend at least partially into the openings 102 from the inner surface of the face block 100. Inasmuch as the basic module will include four channel pockets, and as the plug-accommodating busses, for a balancing of the socket positions, will normally mount within three adjacent pockets, the plug receiving openings 102 will be offset toward one side of the face block 100 and module 10 as illustrated in selected ones of the figures. While the module can be defined with only three pockets or sets of channels, to facilitate a central positioning of the plug sockets and openings, the fourth pair of channels, accommodating a fourth bus, is particularly desirable in expanding the capabilities of the basic module for two pole switches, switched receptacles, and the like, the internal busses being configured in accord with the function of the module.

Figures 9, 10:
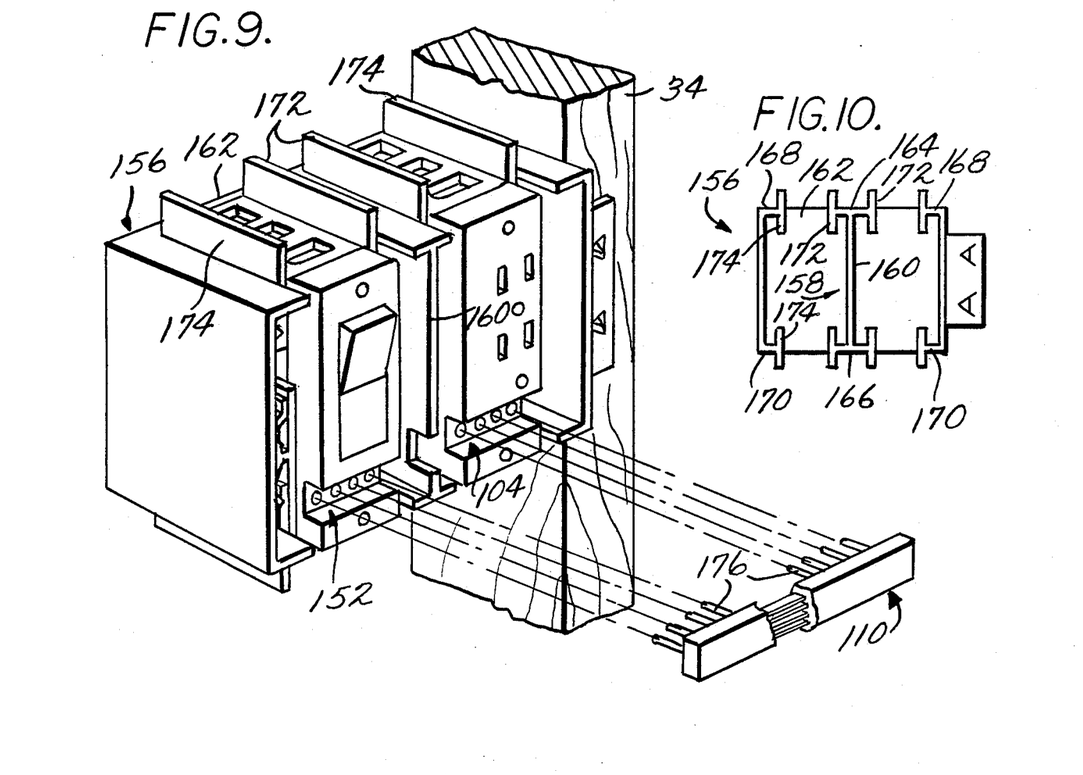
FIG. 9 is a perspective view of ganged fixtures within a dual outlet box and with a jumper bar exploded therefrom.
FIG. 10 is a schematic front elevational view of the dual box of FIG. 9.

Each face block 100, regardless of the functional construction thereof, that is whether for a receptacle, switch, or the like, includes a transverse recess 104 across a lower portion thereof aligned with the forward ends of the lower grooves 50 and hence the forward ends of the lower transfer branches 88. The inner base wall 106 of the recess 104 includes a series of openings 108 therethrough, one aligned with each of the transfer branch sockets 90 for the accommodation of a feed-jack or feed-bar 110 in a ganging assembly of modules as illustrated in FIG. 9 and as shall be referred to subsequently. The recess 104, when not accommodating a feed-bar 110, can be closed or plugged by a filler bar 112 with or without non-conductive prongs projecting therefrom and engaged through the recess openings 108 into the transfer branch sockets 90 to provide a finished face to the face block 100. The face block 100 and the module 10 are completed by providing upper and lower internally threaded bores 114 for the accommodation of screws 116 utilized to mount a wall plate 118 which, in a conventional manner, will overlie, conceal and provide a finished appearance to and between the peripheral edges of the module, wall box and wall covering or wall board 120.

Noting FIGS. 5 and 6 in particular, the mounted module 10 will receive the leading end portion of a power cable 124 within one of the plug compartments 54. This lead end of the power cable 124 can, as a matter of coupling convenience, mount a male plug 126 incorporating multiple prongs 128 to which the wires of the cable 124 are conductively joined. Both the female plug-receiving compartments 54 and the male plugs 126 will be configured, for example as illustrated, to insure a proper wiring sequence of the module. Means for releasable locking the plug 126 within the corresponding compartment, beyond the frictional engagement of the prongs 128 within the bus wire sockets 86, may also be provided. Noting FIG. 5, it will be recognized that the plug prongs 128 are received within the wire sockets in the power branches 84 of the busses 80 upon an introduction of the male plug 126 within the corresponding compartment 54, the wire sockets 86 of the busses 80 aligning transversely across each compartment 54. As an alternative to the use of a male plug 126, the wire sockets 86 of the busses can be configured to directly receive exposed wires of the cable 124. In each instance, the upper grooves 50 of the bus-receiving pockets provides a positive lateral stability to the upper power branches 84 of the busses 80 in addition to a lateral insulation thereof from each other in order to provide a stable base for reception of the prongs or wires of the cable 124.

The remaining two female plug-receiving compartments 54 will receive distribution cables 130, with the provision of at least three compartments 54 allowing for complete flexibility for the wiring of multi-wire branch circuits and the like. As will be noted in the drawings, the upper vertical positioning plates 22 of the wall box 12, above the upper flanges 18 which define the top wall of the wall box provide side guards for the leading end portions of the cables 124 and 130.

Figure 7:
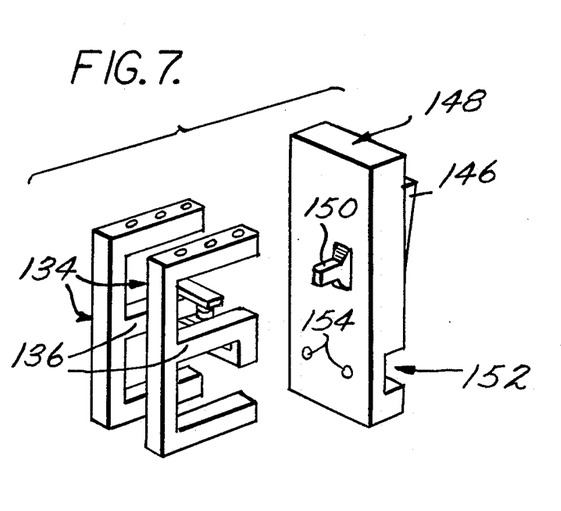
FIG. 7 is an exploded perspective view of selected components of a switch fixture in accord with the invention.
Figure 8:
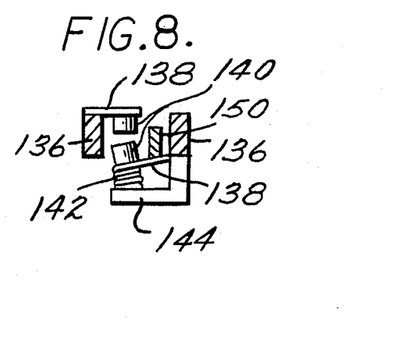
FIG. 8 is a cross-sectional detail illustrating one manner contact manipulation for the switch of FIG. 7.

FIGS. 7 and 8 schematically illustrate the adaptability of the basic module to form different devices. More particularly, assuming a simple single pole switch with toggle operator, two laterally spaced busses 134 will be mounted, preferably within the two end pockets of the housing or shell 10. The busses 134 will each include a central branch 136 extending forwardly to the hollow interior or chamber of the housing and terminating in transversely extending overlying switch terminals 138 provided with facing contacts 140.

The lowermost switch terminal 138 is resiliently biased upward to engage the contacts, either through an inherent resiliency of the switch terminal itself or by means of a biasing spring 142 engaged vertically between a support shoulder 144 projecting in underlying relation to the lower switch terminal 138 from the same branch 136. The switch control 146 will mount within the face block 148 and, assuming the switch terminal arrangement above described, will include an inwardly extending toggle lever 150 which overlies the lower switch terminal 138 for a selective downward movement thereof against the biasing action of the spring 142 or the like in order to disengage the contacts 140 and open the switch. As will be appreciated, the specific switch mechanism within the face block 148 will depend upon the particular terminal arrangement within the housing. Further, the open chamber interior of the module housing 40 and the drop-in nature of the busses provide for the formation of any type of device desired within the modular configuration of the module and the modular relationship thereof to the wall or outlet box.

As noted, the face block 148 will also include the transverse feed-bar recess 152 and the access bores 154 for accommodating feed-bar prongs therethrough and into the socketed ends of the lower bus branches.

FIG. 9 illustrates a gang assembly of modules mounted within a gang wall or outlet box 156. The box 156, schematically shown in FIG. 10, is basically an expanded version of box 12, differing therefrom in the inclusion of a central partition 158 which defines a module-receiving cell to each side thereof. The central partition 158 includes a vertical partition wall 160 projecting forwardly from the back wall 162, top and bottom flanges 164 and 166 defining the top and bottom walls of the box 156 in conjunction with the top and bottom side wall flanges 168 and 170. Each of the flanges 164 and 166 in turn mounts vertical positioning plates 172 along the opposed front-to-rear edges thereof. These vertical positioning plates 172 duplicate the side wall positioning plates 174, which in turn duplicate the originally described vertical positioning plates 22, and similarly include longitudinally extending locking grooves therein for a fixed locking of the modules in position through camming manipulation of the associated locking plates.

The feed-bar 110 allows for one hot feed to come into the ganged modules for a common feeding of all of the modules. The feed-bar 110 nests within the aligned module recesses 104 and 152, and includes projecting conductive prongs 176 communicating with the corresponding sockets of the lower transfer branches of the busses. As will be appreciated, the prongs 176, engaging with the separate modules, are conductively paired within the insulating body of the feed-bar. When mounted, the feed-bar 110 is flush with the forward faces of the module, providing a finished appearance and eliminating the necessity of providing and separately wiring external jumper wires. In order to accommodate the feed-bar 110, it will be appreciated that the central partition wall 160 of the multiple module box 156 has the forward edge thereof inwardly offset to at least the depth of the module recesses. The front mounting of feed-bar 110 is considered of particular significance in enabling a disengagement of the electrical feed between the modules through merely a forward or outward pulling of the feed-bar which is readily accessible upon removal of the wall plate, and which eliminates the heretofore tedious requirements of fully exposing the receptacles and individually disengaging the jumper wires.

As will be recognized, the ganging of the modules can be extended beyond the two illustrated. This will also entail an expansion of the outlet box by the provision of duplicate cells defined by additional intermediate partitions similar to the partition 158. In each case, each of the cells will include duplicate upper and lower vertical positioning plates, each provided with an elongate locking groove for engagement of the module locking plates therewith in the manner previously described.

From the foregoing, it will be appreciated that modular electrical system of the invention is unique in several aspects, including the degree of accessibility available for the installed modules. This accessibility allows convenient repair, upgrading, module substitution, and the like, simply and expeditiously. Basically, upon a removal of the wall plate 118, mounted in a conventional manner by screws 116, the module or modules are completely exposed. In a gang assembly, the ganged modules are electrically separated by removal of the single feed-bar. Removal of the individual modules requires only a rotation of the two camming rods associated with each module, after which the individual module can be raised slightly between the upper and lower positioning plates and pivoted with the bottom of the module foremost to withdraw the module from the outlet box and through the wall opening. The engagement of the power and distribution cables solely with the top of the module allow for this free outward swinging of the module and ready disconnection of the cables. The provision for an electrical coupling of the cables to the module through a single face thereof is significant in providing for maximum accessibility. Of similar importance is the relationship between the module and the wall box whereby, upon a release of the side locking plates, the module is freely movable within and from the box without damage to the building structure or finish.

The relationship between the modules and the wall or outlet boxes also uniquely adapt the system for expedited installation, wiring and testing. As desired, the modules can be mounted within the boxes at the point of origin, for example the manufacturer, and shipped as units for direct installation without requiring on site mounting of the modules within the boxes. Once mounted, the wires are brought to the individual modules and the ends stripped and either stabbed directly into the upper power branches of the busses or mounted within male plugs which in turn engage within the bus sockets. The entire system can then be hot tested and verified as to the integrity thereof before completion of the walls.

The foregoing is illustrative of the principles of the invention. The specific details of the system components are exemplary and do not necessarily constitute the limits of the invention.

I claim:

1. A modular electrical wiring assembly including an outlet box and an electrical device slidably received within said box, said outlet box including positioning means for receiving and positioning said electrical device, and locking means on said electrical device engageable with said positioning means for a releasable fixing of said electrical device within said box and to said positioning means, said positioning means comprising an elongate positioning panel within said box, said panel having opposed inner and outer faces, said electrical device engaging against the inner face of said positioning panel, said locking means engaging the outer face of said positioning panel and clamping said electrical device thereagainst.

2. The modular assembly of claim 1 wherein said positioning means includes a second duplicate positioning panel laterally spaced from said first positioning panel, said electrical device being received between and in engagement with both of said positioning panels.

3. The modular assembly of claim 2 wherein said outlet box includes a rear wall, a pair of opposed side walls, and a pair of opposed end walls transversely between said side walls, said side and end walls projecting forwardly from said rear wall and defining and open forward box face, said positioning panels extending rearwardly relative to said box face in laterally inwardly spaced relation to said side walls.

4. The modular assembly of claim 3 wherein said positioning panels are laterally aligned and rigid with one of said end walls.

5. The modular assembly of claim 4 including a second duplicate pair of laterally aligned positioning panels rigid with the second end wall and respectively coplanar with the first pair of positioning panels.

6. The modular assembly of claim 5 wherein each of said end walls is defined by laterally inwardly directed coplanar flanges, one on each side wall, said flanges terminating in laterally spaced inner edges, said positioning panels being fixed to said inner edges.

7. The modular assembly of claim 6 wherein each of said positioning panels extends transversely across and laterally outward beyond the corresponding flange edge.

8. The modular assembly of claim 7 wherein said locking means and the corresponding positioning panel include interengaging lock components selectively locked and released in response to manipulation of said locking means.

9. The modular assembly of claim 8 wherein said locking means comprises a lock plate, hinge means joining said lock plate to said electrical device, a first free edge on said lock plate to one side of said hinge means, said lock components including a recess in the corresponding positioning panel and a projection on the free edge of said lock plate, and means for pivoting said lock plate about said hinge means to engage said projection in said recess.

10. The modular assembly of claim 9 wherein said lock plate extends beyond said hinge means to the opposite side thereof from said first free edge and terminates in a second free edge, said means for pivoting said lock plate comprising camming means engageable between said electric device and said locking plate adjacent the second free edge thereof for a selective movement of said second free edge outward relative to the electrical device and a corresponding inward pivoting of the first free edge about said hinge means.

11. The modular assembly of claim 1 wherein said locking means and said positioning panel include interengaging lock components selectively locked and released in response to manipulation of said locking means.

12. The modular assembly of claim 11 wherein said positioning means includes a second duplicate positioning panel laterally aligned with the first positioning panel, said electrical device being received between and in engagement with both of said panels.

13. The modular assembly of claim 12 including second locking means and interengaging lock components on said second locking means and said second positioning panel, each of said locking means including a lock plate hingedly joined to said electrical device, and means for pivoting said lock plate for locking engagement with the corresponding positioning panel.

14. For use in a modular electrical wiring system, an outlet box, said box comprising a rear panel, laterally spaced side panels, said side panels having rear edges fixed to said rear panel, said side panels projecting forwardly from said rear panel and terminating in forward edges, said side panels including first and second end edges transversely between the rear and front edges thereof, said first end edges of the side panels having coplanar flanges thereon laterally inwardly directed toward each other and terminating in laterally spaced free edges, said second end edges having coplanar flanges thereon laterally inwardly directed toward each other and terminating in laterally spaced free edges, and positioning plates fixed to selected ones of said free edges and extending laterally thereof in inwardly spaced generally parallel relation to said side walls, said positioning plates defining a free space therebetween for the mounting reception of an electrical module.

15. The outlet box of claim 14 including duplicate positioning plates rigid with each of said free edges, the positioning plates on the free edges of the first and second flanges of each side wall being coplanar.

16. The outlet box of claim 15 wherein each positioning plate projects transversely outward of the corresponding flange.

17. The outlet box of claim 15 including an intermediate partition between and parallel to said side panels, said partition including opposed end edges with flanges transversely thereacross coplanar with and in inwardly spaced relation to the side panel flanges, said intermediate partition flanges having free side edges, and a positioning plate rigid with each of said partition flange free edges and extending laterally thereof, the positioning plates of the intermediate partition each facing one of the positioning panels on the side panel flanges in spaced relation thereto for the reception of a modular electrical device therebetween for a gang assembly of multiple modular devices.

18. A modular electrical device comprising a casing including a rear wall, laterally spaced side walls, and opposed spaced end walls transversely between said side walls, said side and end walls defining an open forward face, a series of pockets defined in said casing extending inward from said open forward face between said side walls and in spaced relation to each other, each pocket being defined by recesses along said rear and end walls, the interior of said casing inward of said recesses defining a hollow chamber, conductor busses slidably received in selected ones of said pockets, cable-receiving means in said casing opening into said pockets for electrical engagement of power cables with pocket-received busses, and a face panel closing the forward face of the casing, said face panel including means cooperating with selected busses for electric power distribution.

19. The modular electrical device of claim 18 wherein each bus includes a rear trunk engaged in a rear wall recess, a first end branch engaged in the corresponding end wall recess of one end wall, and a second end branch engaged in the corresponding end wall recess of the other end wall, selected ones of said busses including intermediate branches extending into said hollow chamber, said intermediate branches determining the function of the electrical device, said face panel being formed to provide access to said intermediate branches therethrough.

20. The modular electrical device of claim 19 wherein each of said first end branches has socket defining means accessible through said cable-receiving means, said second end branches having socket-defining means opening toward said face panel, and apertures defined through said face panel aligned with said socket-defining means of said second end branches, said face panel including a recess therein aligned across said apertures.

21. The modular electrical device of claim 20 in combination with a second laterally spaced modular electrical device, said second electrical device including internal busses with end branches having socket-defining means, and a face panel with a recess thereacross and apertures defined therethrough in alignment with selected end branches and socket-defining means, and a rigid jumper bar received within the face panel recesses of the two modular devices, said jumper bar including prongs engaged through the face panel apertures and into the socket-defining means of the aligned end branches, said prongs being electrically conductive with conductive means joining pairs of prongs, one engaged with each electrical device for a transfer of power therebetween.

22. A modular electrical device comprising a casing including a rear wall, laterally spaced side walls, and opposed spaced end walls transversely between said side walls, said side and end walls defining an open forward face, a series of pockets defined in said casing extending inward from said open forward face between said side walls and in spaced relation to each other, conductor busses slidably received in selected ones of said pockets, cable-receiving means in said casing opening into said pockets for electrical engagement of power cables with pocket-received busses, a face panel closing the forward face of the casing, said face panel including means cooperating with selected busses for electric power distribution, a locking plate, hinge means mounting said locking plate on a side wall of said casing in slight outwardly spaced generally parallel relation thereto, said locking plate having opposed free edges, one to each side of and parallel to said hinge means, and camming means engaged between said casing and said locking plate to one side of said hinge means for a selective pivotal varying of the space between the locking plate and the casing for clamp-locking to an interposed member.

23. The modular electrical device of claim 22 including a duplicate locking plate hinge-mounted to the second side wall of the casing.

24. A modular electrical device comprising a casing including laterally spaced side walls and opposed spaced end walls transversely between said side walls, said side and end walls defining an open forward face, a series of pockets defined in said casing extending inward from said open forward face between said side walls and in spaced relation to each other, each pocket including a pair of opposed recesses along said end walls, the interior of said casing inward of said recesses defining a hollow chamber, conductor busses generally slidably received in selected ones of said pockets, each bus including a first end branch engaged in the end wall recess of one end wall, and a second end branch engaged in the corresponding end wall recess of the other end wall, selected ones of said busses including intermediate branches extending into said hollow chamber, said intermediate branches determining the function of the electrical device, cable-receiving means in said casing opening into said pockets for electrical engagement of power cables with pocket-received busses, and a face panel closing the forward face of the casing, said face panel including means cooperating with selected busses for electric power distribution.

25. The modular electrical device of claim 24 wherein each of said first end branches has socket defining means accessible through said cable-receiving means, said second end branches having socket-defining means opening toward said face panel, and apertures defined through said face panel aligned with said socket-defining means of said second end branches; and a second laterally positioned modular electrical device, said second electrical device including internal busses with end branches having socket-defining means, and a face panel with apertures defined therethrough in alignment with selected end branches of said second electrical device and said socket-defining means therein, and a rigid jumper bar received across the face panels of the two modular devices, said jumper bar including prongs engaged through said face panel apertures and into said socket-defining means of the aligned end branches, said prongs being electrically conductive with conductive means joining pairs of prongs, one engaged with each electrical device for a transfer of power therebetween.

* * * * *